(12) United States Patent
Yi et al.

(10) Patent No.: US 11,465,161 B2
(45) Date of Patent: *Oct. 11, 2022

(54) METHODS OF IMPROVING ACCURACY AND PRECISION OF DROPLET METERING USING AN ON-ACTUATOR RESERVOIR AS THE FLUID INPUT

(71) Applicant: ADVANCED LIQUID LOGIC, INC., San Diego, CA (US)

(72) Inventors: Uichong B. Yi, San Diego, CA (US); Vijay Srinivasan, Cary, NC (US)

(73) Assignee: ADVANCED LIQUID LOGIC, INC., San Diego, CA (US)

( * ) Notice: Subject to any disclaimer, the term of this patent is extended or adjusted under 35 U.S.C. 154(b) by 86 days.

This patent is subject to a terminal disclaimer.

(21) Appl. No.: 16/948,238

(22) Filed: Sep. 9, 2020

(65) Prior Publication Data
US 2020/0398290 A1 Dec. 24, 2020

Related U.S. Application Data

(63) Continuation of application No. 16/176,329, filed on Oct. 31, 2018, now Pat. No. 10,799,892, which is a
(Continued)

(51) Int. Cl.
*B05B 5/025* (2006.01)
*G01F 23/22* (2006.01)
(Continued)

(52) U.S. Cl.
CPC .......... *B05B 5/0255* (2013.01); *B05B 12/082* (2013.01); *G01F 23/22* (2013.01); *G01F 23/24* (2013.01); *G01F 23/26* (2013.01)

(58) Field of Classification Search
CPC ..... B05B 5/0255; B05B 12/082; G01F 23/22; G01F 23/24; G01F 23/26
(Continued)

(56) References Cited

U.S. PATENT DOCUMENTS 6,565,727 B1 5/2003 Shenderov et al.
6,773,566 B2 8/2004 Shenderov et al.
(Continued)

FOREIGN PATENT DOCUMENTS

WO 2007/120241 10/2007
WO 2008/098236 8/2008
(Continued)

OTHER PUBLICATIONS

International Search Report and Written Opinion of International Application No. PCT/US14/50885 dated Nov. 21, 2014.
(Continued)

*Primary Examiner* — Steven J Ganey
(74) *Attorney, Agent, or Firm* — Advance Liquid Logic, Inc.

(57) ABSTRACT

The present invention is directed to methods of improving accuracy of droplet metering using at least one on-actuator reservoir as the fluid input. In some embodiments, the on-actuator reservoir that is used for metering droplets includes a loading port, a liquid storage zone, a droplet metering zone, and a droplet dispensing zone. The on-actuator reservoirs are designed to prevent liquid flow-back into the loading port and to prevent liquid from flooding into the droplet operations gap in the dispensing zone.

18 Claims, 5 Drawing Sheets

Related U.S. Application Data continuation of application No. 14/911,191, filed as application No. PCT/US2014/050885 on Aug. 13, 2014, now Pat. No. 10,124,351.

(60) Provisional application No. 61/874,402, filed on Sep. 6, 2013, provisional application No. 61/865,336, filed on Aug. 13, 2013.

(51) Int. Cl.
*G01F 23/24* (2006.01)
*G01F 23/26* (2022.01)
*B05B 12/08* (2006.01)

(58) Field of Classification Search
USPC .... 239/102.1, 102.2, 302, 601, 690; 347/45, 347/47
See application file for complete search history.

(56) References Cited

U.S. PATENT DOCUMENTS

| | | | |
|---|---|---|---|
| 6,911,132 B2 | 6/2005 | Pamula et al. | |
| 6,977,033 B2 | 12/2005 | Becker et al. | |
| 7,010,391 B2 | 3/2006 | Handique et al. | |
| 7,052,244 B2 | 5/2006 | Fouillet et al. | |
| 7,163,612 B2 | 1/2007 | Sterling et al. | |
| 7,328,979 B2 | 2/2008 | Decre et al. | |
| 7,439,014 B2 | 10/2008 | Pamula et al. | |
| 7,547,380 B2 | 6/2009 | Velev | |
| 7,641,779 B2 | 1/2010 | Becker et al. | |
| 7,727,466 B2 | 6/2010 | Meathrel et al. | |
| 8,562,807 B2 * | 10/2013 | Srinivasan | G01N 27/44743 204/600 |
| 8,926,065 B2 * | 1/2015 | Winger | B41J 2/14 347/45 |
| 10,124,351 B2 * | 11/2018 | Yi | G01F 23/24 |
| 2003/0132538 A1 | 7/2003 | Chandler | |
| 2003/0205632 A1 | 11/2003 | Kim et al. | |
| 2005/0118574 A1 | 6/2005 | Chandler et al. | |
| 2005/0179746 A1 | 8/2005 | Roux et al. | |
| 2005/0260686 A1 | 11/2005 | Watkins et al. | |
| 2005/0277197 A1 | 12/2005 | Chandler et al. | |
| 2006/0039823 A1 | 2/2006 | Yamakawa et al. | |
| 2006/0159962 A1 | 7/2006 | Chandler et al. | |
| 2006/0164490 A1 | 7/2006 | Kim et al. | |
| 2006/0194331 A1 | 8/2006 | Pamula et al. | |
| 2007/0023292 A1 | 2/2007 | Kim et al. | |
| 2007/0064990 A1 | 3/2007 | Roth | |
| 2007/0207513 A1 | 9/2007 | Sorensen et al. | |
| 2008/0053205 A1 | 3/2008 | Pollack et al. | |
| 2008/0124252 A1 | 5/2008 | Marchand et al. | |
| 2008/0151240 A1 | 6/2008 | Roth | |
| 2008/0283414 A1 | 11/2008 | Monroe et al. | |
| 2008/0305481 A1 | 12/2008 | Whitman et al. | |
| 2009/0192044 A1 | 7/2009 | Fouillet | |
| 2009/0283407 A1 | 11/2009 | Shah et al. | |
| 2009/0321262 A1 | 12/2009 | Adachi et al. | |
| 2010/0096266 A1 | 4/2010 | Kim et al. | |
| 2010/0194408 A1 | 8/2010 | Sturmer et al. | |
| 2011/0097763 A1 * | 4/2011 | Pollack | C12Q 1/686 435/91.2 |
| 2011/0104747 A1 | 5/2011 | Pollack et al. | |
| 2011/0118132 A1 | 5/2011 | Winger et al. | |
| 2012/0018306 A1 | 1/2012 | Srinivasan et al. | |
| 2012/0280143 A1 | 11/2012 | Kim et al. | |
| 2013/0168250 A1 | 7/2013 | Fogleman et al. | |
| 2019/0060923 A1 * | 2/2019 | Yi | B05B 12/082 |

FOREIGN PATENT DOCUMENTS

| | | |
|---|---|---|
| WO | 2008/101194 | 8/2008 |
| WO | 2008/106678 | 9/2008 |
| WO | 2008/116221 | 9/2008 |
| WO | 2008/134153 | 11/2008 |
| WO | 2009/003184 | 12/2008 |
| WO | 2009/021173 | 2/2009 |
| WO | 2009/076414 | 6/2009 |
| WO | 2009/086403 | 7/2009 |
| WO | 2010/027894 | 3/2010 |
| WO | 2011/002957 | 1/2011 |

OTHER PUBLICATIONS

Dhindsa, et al., "Virtual Electrowetting Channels: Electronic Liquid Transport with Continuous Channel Functionality", Lab on a Chip, vol. 10, 2010, 832-836.

* cited by examiner

METHODS OF IMPROVING ACCURACY AND PRECISION OF DROPLET METERING USING AN ON-ACTUATOR RESERVOIR AS THE FLUID INPUT

CROSS-REFERENCE TO RELATED APPLICATIONS

This patent application is a continuation of U.S. application Ser. No. 16/176,329, filed on Oct. 31, 2018, which is a continuation of U.S. application Ser. No. 14/911,191, filed on Feb. 9, 2016, now U.S. Pat. No. 10,124,351, issued on Nov. 13, 2018, which is a U.S. National Phase application of International Patent Application No. PCT/US2014/050885, filed Aug. 13, 2014, entitled "Methods of Improving Accuracy and Precision of Droplet Metering Using an On-Actuator Reservoir as the Fluid Input," the application of which is related to and claims priority to U.S. Provisional Patent Application Nos. 61/865,336, filed on Aug. 13, 2013, entitled "Methods of Improving Accuracy and Precision of Droplet Metering Using an On-Actuator Reservoir as the Fluid Input;" and 61/874,402, filed on Sep. 6, 2013, entitled "Methods of Improving Accuracy and Precision of Droplet Metering Using an On-Actuator Reservoir as the Fluid Input," the entire disclosures of which are incorporated herein by reference.

FIELD OF THE INVENTION

The invention relates to methods and systems for improving accuracy of droplet metering using an on-actuator reservoir as the fluid input.

BACKGROUND

A droplet actuator typically includes one or more substrates configured to form a surface or gap for conducting droplet operations. The one or more substrates establish a droplet operations surface or gap for conducting droplet operations and may also include electrodes arranged to conduct the droplet operations. The droplet operations substrate or the gap between the substrates may be coated or filled with a filler fluid that is immiscible with the liquid that forms the droplets. It can be difficult to control the size and volume of droplets dispensed in a droplet actuator. There is a need for new approaches to accurately dispensing droplets in a droplet actuator.

BRIEF DESCRIPTION OF THE INVENTION

A droplet actuator is provided, including at least one on-actuator reservoir, the at least one on-actuator reservoir including: a) a loading port; b) a liquid storage zone; c) a droplet metering zone; and d) a droplet dispensing zone; where the at least one on-actuator reservoir is designed for improving the accuracy of droplet metering. In certain embodiments, the droplet dispensing zone includes a top substrate and a bottom substrate separated to form a droplet operations gap. In other embodiments, the bottom substrate includes a droplet processing region, particularly where the droplet processing region includes at least one arrangement of droplet operations electrodes disposed on the bottom substrate. In further embodiments, the at least one arrangement of droplet operations electrodes includes at least one arrangement of electrowetting-mediated droplet operations electrodes. In other embodiments, a plurality of sets of reservoir electrodes are disposed on the bottom substrate. In still further embodiments, an on-actuator reservoir is formed in the top substrate at each set of reservoir electrodes. In other embodiments, the metering zone is a bulk liquid metering zone.

In another embodiment, the storage zone, metering zone, and dispensing zone of the on-actuator reservoir of the droplet actuator are each characterized by different gap heights. In certain embodiments, the gap height of the storage zone is h1, the gap height of the metering zone is h2, and the gap height of the dispensing zone is h3. In other embodiments, h1>h2>h3. In other embodiments, h1 is about 3 mm, h2 is about 800 and h3 is about 300 particularly where the capacity of the on-actuator reservoir is about 61.58 µL or about 47.45 µL. In further embodiments, h1 is about 2400 h2 is about 800 and h3 is about 300 particularly where the capacity of the on-actuator reservoir is about 45.17 µL or about 33.25 µL. In other embodiments, h1 is about 200 h2 is about 800 and h3 is about 300 particularly where the capacity of the on-actuator reservoir is about 35.37 µL or about 25.09 µL. In further embodiments, h1 is about 1600 h2 is about 1000 and h3 is about 312.5 particularly where the capacity of the on-actuator reservoir is about 26.48 µL. In other embodiments, h1 is about 3000 h2 is about 1600 and h3 is about 312.5 particularly where the capacity of the on-actuator reservoir is about 61.58 µL. In further embodiments, h1 is about 3000 h2 is about 1200 and h3 is about 312.5 particularly where the capacity of the on-actuator reservoir is about 62.58 µL. In other embodiments, h1 is about 2000 µm, h2 is about 1000 µm, and h3 is about 300 µm, particularly where the capacity of the on-actuator reservoir is about 25.09 µL. In further embodiments, h1 is about 3000 µm, h2 is about 1600 µm, and h3 is about 300 µm, particularly where the capacity of the on-actuator reservoir is about 47.45 µL. In other embodiments, h1 is about 3000 µm, h2 is about 1200 µm, and h3 is about 300 µm, particularly where the capacity of the on-actuator reservoir is about 47.45 µL. In further embodiments, h1 is about 800 µm, h2 is about 800 µm, and h3 is about 300 µm. In other embodiments, the length of the dispensing zone is selected from the group consisting of 1.5× the height h2, 2× the height h2, 2.5× the height h2, and 3× the height h2. In further embodiments, the width of the dispensing zone is selected from the group consisting of 1.5× the height h2, 2× the height h2, 2.5× the height h2, and 3× the height h2. In still further embodiments, the length and the width of the dispensing zone are each independently selected from the group consisting of 1.5× the height h2, 2× the height h2, 2.5× the height h2, and 3× the height h2.

In a further embodiment, the top substrate of the droplet actuator includes a transition region for transitioning the gap height from the metering zone to the dispensing zone. In another embodiment, the transition region includes a slope in the surface of the top substrate that is facing the droplet operations gap, particularly where the slope is about 45 degrees.

In another embodiment, the loading port of the droplet actuator includes a cup portion for holding a volume of liquid. In a further embodiment, the cup portion is fitted upon an upwardly protruding outlet portion. In another embodiment, the cup portion includes an upper portion, further where the upper portion is enclosed but includes an opening therein. In a further embodiment, the opening of the upper portion of the cup portion is substantially triangular in footprint. In another embodiment, the outlet portion includes an opening therein. In a further embodiment, the opening of the outlet portion is substantially circular in footprint. In another embodiment, the cup portion of the loading port is filled with liquid at least up to the height of the outlet portion of the loading port. In a further embodiment, a pressure loading source is coupled to the opening of the cup portion of the loading port.

In another embodiment, the loading port of the droplet actuator includes an upper portion and a lower portion, where the upper portion is open. In a further embodiment, the lower portion of the loading port includes an outlet that allows liquid to flow into the droplet operations gap. In another embodiment, a pressure loading source is coupled to the outlet of the loading port. In a further embodiment, the pressure loading source is a pipette including a pipette tip, particularly where the outlet of the loading port is designed for the pipette tip to be fitted therein.

In another embodiment, the droplet actuator further includes a plurality of droplet processing lanes, where the droplet processing lanes are formed by and fluidly connected by the at least one arrangement of droplet operations electrodes, particularly where the plurality of droplet processing lanes includes eight droplet processing lanes.

In a further embodiment, the relationship of each set of reservoir electrodes to the on-actuator reservoir formed in the top substrate at each set of reservoir electrodes is such that the larger segments of the reservoir electrodes are oriented toward the storage zone of the on-actuator reservoir and the smaller segments of each set of reservoir electrodes are oriented toward the dispensing zone of the on-actuator reservoir.

In another embodiment, the diameter of the opening leading from the loading port into the storage zone in the droplet actuator is small enough compared to the liquid storage area to prevent liquid flow-back into the space above the storage zone. In a further embodiment, the design of the loading port and the storage zone prevents liquid flow-back onto the outside surface of the top substrate, particularly where the outside surface of the top substrate does not comprise a CYTOP coating. In another embodiment, the at least one on-actuator reservoir prevents liquid from flooding into the droplet operations gap in the dispensing zone. In a further embodiment, the bottom substrate of the droplet actuator comprises a set of power/signal I/O pads patterned at one end thereof.

In another embodiment, the at least one reservoir of the droplet actuator supplies the droplet processing region, particularly wherein the at least one reservoir is a sample reservoir or a reagent reservoir. In a further embodiment, each set of reservoir electrodes supports an on-actuator reservoir, particularly where the plurality of sets of reservoir electrodes comprises seven or eight sets of reservoir electrodes. In another embodiment, the droplet processing region supplies at least one collection or waste reservoir. In a further embodiment, the droplet processing region supplies a plurality of sets of reservoir electrodes.

Methods of improving accuracy of droplet metering on a droplet actuator are also provided using a droplet actuator as disclosed herein, where the droplet actuator comprises a loading port that includes a cup portion for holding a volume of liquid, where the cup portion is fitted upon an upwardly protruding outlet portion, and where the cup portion includes an upper portion, further where the upper portion is enclosed but includes an opening therein. The method comprises the steps of: a) Coupling the pressure loading source to the opening of the cup portion of the loading port; b) Flowing sufficient liquid into the storage zone to fill the storage zone without causing liquid to flow into the dispensing zone or creating enough pressure to permit the liquid to flow into the metering zone and/or the dispensing zone or creating enough pressure to cause the liquid to escape back through the loading port to the exterior of droplet actuator; c) Metering sub-droplets from liquid in the storage zone into the metering zone using the reservoir electrodes in the metering zone to yield metered droplets in the metering zone; and d) Dispensing sub-droplets from the metered droplets in the metering zone, using reservoir electrodes in the dispensing zone to dispense sub-droplets onto the droplet operations electrodes; where the method provides for accurate droplet metering on a droplet actuator. In a particular embodiment, the cup portion of the loading port is filled with liquid at least up to the height of the outlet portion of the loading port. In a further embodiment, a pressure loading source is coupled to the opening of the cup portion of the loading port. In some embodiments, the metering zone is a bulk liquid metering zone, particularly where relatively constant pressure of a volume of bulk liquid in the bulk liquid metering zone is maintained prior to droplet dispensing. In other embodiments, metering of a bulk liquid in the bulk liquid metering zone prior to droplet dispensing comprises dispensing of a single droplet or dispensing of multiple droplets. In a further embodiment, the at least one on-actuator reservoir is designed to prevent liquid flow-back into the loading port. In another embodiment, the diameter of the opening leading from the loading port into the storage zone is small enough compared to the liquid storage area to prevent liquid flow-back into the space above the storage zone. In a further embodiment, the design of the loading port and the storage zone prevents liquid flow-back onto the outside surface of the top substrate. In another embodiment, the at least one on-actuator reservoir prevents liquid from flooding into the droplet operations gap in the dispensing zone. In a further embodiment, modular changes are made to the design of the functional zones to provide increased liquid processing capacity and/or to provide for different zone and/or gap heights without the need for changing the entire droplet actuator and/or system design.

A method of improving accuracy of droplet metering on a droplet actuator is also provided, where the droplet actuator comprises any of the droplet actuators as disclosed herein, further where the loading port comprises an upper portion and a lower portion, where the upper portion is open. The method comprises the steps of: a) Coupling the pressure loading source to the outlet of the loading port; b) Flowing sufficient liquid into the storage zone to fill the storage zone without causing liquid to flow into the dispensing zone or creating enough pressure to permit the liquid to flow into the metering zone and/or the dispensing zone or creating enough pressure to cause the liquid to escape back through the loading port to the exterior of droplet actuator; c) Metering sub-droplets from liquid in the storage zone into the metering zone using the reservoir electrodes in the metering zone to yield metered droplets in the metering zone; and d) Dispensing sub-droplets from the metered droplets in the metering zone, using reservoir electrodes in the dispensing zone to dispense sub-droplets onto the droplet operations electrodes; wherein the method provides for accurate droplet metering on a droplet actuator. In one embodiment, the pressure loading source is a pipette comprising a pipette tip, further wherein the outlet of the loading port is designed for the pipette tip to be fitted therein. In another embodiment, the metering zone is a bulk liquid metering zone. In some embodiments, the metering zone is a bulk liquid metering zone, particularly where relatively constant pressure of a volume of bulk liquid in the bulk liquid metering zone is maintained prior to droplet dispensing. In other embodiments, metering of a bulk liquid in the bulk liquid metering zone prior to droplet dispensing comprises dispensing of a single droplet or dispensing of multiple droplets. In a further embodiment, the at least one on-actuator reservoir is designed to prevent liquid flow-back into the loading port. In another embodiment, the diameter of the opening leading from the loading port into the storage zone is small enough compared to the liquid storage area to prevent liquid flow-back into the space above the storage zone. In a further embodiment, the design of the loading port and the storage zone prevents liquid flow-back onto the outside surface of the top substrate. In another embodiment, the at least one on-actuator reservoir prevents liquid from flooding into the droplet operations gap in the dispensing zone. In a further embodiment, modular changes are made to the design of the functional zones to provide increased liquid processing capacity and/or to provide for different zone and/or gap heights without the need for changing the entire droplet actuator and/or system design.

A microfluidics system is also provided, where the microfluidics system is programmed to execute any of the methods as described herein on any of the droplet actuators as described herein.

A storage medium is also provided, where the storage medium comprises program code embodied in the medium for executing any of the methods as described herein on any of the droplet actuators as described herein.

A microfluidics system is also provided, where the microfluidics system comprises any of the droplet actuators as described herein coupled to a processor, particularly where the processor executes program code embodied in a storage medium for executing any of the methods as described herein.

These and other embodiments are described more fully below.

Definitions

As used herein, the following terms have the meanings indicated.

"Activate," with reference to one or more electrodes, means affecting a change in the electrical state of the one or more electrodes which, in the presence of a droplet, results in a droplet operation. Activation of an electrode can be accomplished using alternating or direct current. Any suitable voltage may be used. For example, an electrode may be activated using a voltage which is greater than about 150 V, or greater than about 200 V, or greater than about 250 V, or from about 275 V to about 1000 V, or about 300 V. Where alternating current is used, any suitable frequency may be employed. For example, an electrode may be activated using alternating current having a frequency from about 1 Hz to about 10 MHz, or from about 10 Hz to about 60 Hz, or from about 20 Hz to about 40 Hz, or about 30 Hz.

"Bead," with respect to beads on a droplet actuator, means any bead or particle that is capable of interacting with a droplet on or in proximity with a droplet actuator. Beads may be of a wide variety of shapes, such as spherical, generally spherical, egg shaped, disc shaped, cubical, amorphous and other three dimensional shapes. The bead may, for example, be capable of being subjected to a droplet operation in a droplet on a droplet actuator or otherwise configured with respect to a droplet actuator in a manner which permits a droplet on the droplet actuator to be brought into contact with the bead on the droplet actuator and/or off the droplet actuator. Beads may be provided in a droplet, in a droplet operations gap, or on a droplet operations surface. Beads may be provided in a reservoir that is external to a droplet operations gap or situated apart from a droplet operations surface, and the reservoir may be associated with a flow path that permits a droplet including the beads to be brought into a droplet operations gap or into contact with a droplet operations surface. Beads may be manufactured using a wide variety of materials, including for example, resins, and polymers. The beads may be any suitable size, including for example, microbeads, microparticles, nanobeads and nanoparticles. In some cases, beads are magnetically responsive; in other cases beads are not significantly magnetically responsive. For magnetically responsive beads, the magnetically responsive material may constitute substantially all of a bead, a portion of a bead, or only one component of a bead. The remainder of the bead may include, among other things, polymeric material, coatings, and moieties which permit attachment of an assay reagent. Examples of suitable beads include flow cytometry microbeads, polystyrene microparticles and nanoparticles, functionalized polystyrene microparticles and nanoparticles, coated polystyrene microparticles and nanoparticles, silica microbeads, fluorescent microspheres and nanospheres, functionalized fluorescent microspheres and nanospheres, coated fluorescent microspheres and nanospheres, color dyed microparticles and nanoparticles, magnetic microparticles and nanoparticles, superparamagnetic microparticles and nanoparticles (e.g., DYNABEADS® particles, available from Invitrogen Group, Carlsbad, Calif.), fluorescent microparticles and nanoparticles, coated magnetic microparticles and nanoparticles, ferromagnetic microparticles and nanoparticles, coated ferromagnetic microparticles and nanoparticles, and those described in U.S. Patent Publication Nos. 20050260686, entitled "Multiplex flow assays preferably with magnetic particles as solid phase," published on Nov. 24, 2005; 20030132538, entitled "Encapsulation of discrete quanta of fluorescent particles," published on Jul. 17, 2003; 20050118574, entitled "Multiplexed Analysis of Clinical Specimens Apparatus and Method," published on Jun. 2, 2005; 20050277197. Entitled "Microparticles with Multiple Fluorescent Signals and Methods of Using Same," published on Dec. 15, 2005; 20060159962, entitled "Magnetic Microspheres for use in Fluorescence-based Applications," published on Jul. 20, 2006; the entire disclosures of which are incorporated herein by reference for their teaching concerning beads and magnetically responsive materials and beads. Beads may be pre-coupled with a biomolecule or other substance that is able to bind to and form a complex with a biomolecule. Beads may be pre-coupled with an antibody, protein or antigen, DNA/RNA probe or any other molecule with an affinity for a desired target. Examples of droplet actuator techniques for immobilizing magnetically responsive beads and/or non-magnetically responsive beads and/or conducting droplet operations protocols using beads are described in U.S. patent application Ser. No. 11/639,566, entitled "Droplet-Based Particle Sorting," filed on Dec. 15, 2006; U.S. Patent Application No. 61/039,183, entitled "Multiplexing Bead Detection in a Single Droplet," filed on Mar. 25, 2008; U.S. Patent Application No. 61/047,789, entitled "Droplet Actuator Devices and Droplet Operations Using Beads," filed on Apr. 25, 2008; U.S. Patent Application No. 61/086,183, entitled "Droplet Actuator Devices and Methods for Manipulating Beads," filed on Aug. 5, 2008; International Patent Application No. PCT/US2008/053545, entitled "Droplet Actuator Devices and Methods Employing Magnetic Beads," filed on Feb. 11, 2008; International Patent Application No. PCT/US2008/058018, entitled "Bead-based Multiplexed Analytical Methods and Instrumentation," filed on Mar. 24, 2008; International Patent Application No. PCT/US2008/058047, "Bead Sorting on a Droplet Actuator," filed on Mar. 23, 2008; and International Patent Application No. PCT/US2006/047486, entitled "Droplet-based Biochemistry," filed on Dec. 11, 2006; the entire disclosures of which are incorporated herein by reference. Bead characteristics may be employed in the multiplexing aspects of the invention. Examples of beads having characteristics suitable for multiplexing, as well as methods of detecting and analyzing signals emitted from such beads, may be found in U.S. Patent Publication No. 20080305481, entitled "Systems and Methods for Multiplex Analysis of PCR in Real Time," published on Dec. 11, 2008; U.S. Patent Publication No. 20080151240, "Methods and Systems for Dynamic Range Expansion," published on Jun. 26, 2008; U.S. Patent Publication No. 20070207513, entitled "Methods, Products, and Kits for Identifying an Analyte in a Sample," published on Sep. 6, 2007; U.S. Patent Publication No. 20070064990, entitled "Methods and Systems for Image Data Processing," published on Mar. 22, 2007; U.S. Patent Publication No. 20060159962, entitled "Magnetic Microspheres for use in Fluorescence-based Applications," published on Jul. 20, 2006; U.S. Patent Publication No. 20050277197, entitled "Microparticles with Multiple Fluorescent Signals and Methods of Using Same," published on Dec. 15, 2005; and U.S. Patent Publication No. 20050118574, entitled "Multiplexed Analysis of Clinical Specimens Apparatus and Method," published on Jun. 2, 2005.

"Droplet" means a volume of liquid on a droplet actuator. Typically, a droplet is at least partially bounded by a filler fluid. For example, a droplet may be completely surrounded by a filler fluid or may be bounded by filler fluid and one or more surfaces of the droplet actuator. As another example, a droplet may be bounded by filler fluid, one or more surfaces of the droplet actuator, and/or the atmosphere. As yet another example, a droplet may be bounded by filler fluid and the atmosphere. Droplets may, for example, be aqueous or non-aqueous or may be mixtures or emulsions including aqueous and non-aqueous components. Droplets may take a wide variety of shapes; nonlimiting examples include generally disc shaped, slug shaped, truncated sphere, ellipsoid, spherical, partially compressed sphere, hemispherical, ovoid, cylindrical, combinations of such shapes, and various shapes formed during droplet operations, such as merging or splitting or formed as a result of contact of such shapes with one or more surfaces of a droplet actuator. For examples of droplet fluids that may be subjected to droplet operations using the approach of the invention, see International Patent Application No. PCT/US 06/47486, entitled, "Droplet-Based Biochemistry," filed on Dec. 11, 2006. In various embodiments, a droplet may include a biological sample, such as whole blood, lymphatic fluid, serum, plasma, sweat, tear, saliva, sputum, cerebrospinal fluid, amniotic fluid, seminal fluid, vaginal excretion, serous fluid, synovial fluid, pericardial fluid, peritoneal fluid, pleural fluid, transudates, exudates, cystic fluid, bile, urine, gastric fluid, intestinal fluid, fecal samples, liquids containing single or multiple cells, liquids containing organelles, fluidized tissues, fluidized organisms, liquids containing multi-celled organisms, biological swabs and biological washes. Moreover, a droplet may include a reagent, such as water, deionized water, saline solutions, acidic solutions, basic solutions, detergent solutions and/or buffers. Other examples of droplet contents include reagents, such as a reagent for a biochemical protocol, such as a nucleic acid amplification protocol, an affinity-based assay protocol, an enzymatic assay protocol, a sequencing protocol, and/or a protocol for analyses of biological fluids. A droplet may include one or more beads.

"Droplet Actuator" means a device for manipulating droplets. For examples of droplet actuators, see Pamula et al., U.S. Pat. No. 6,911,132, entitled "Apparatus for Manipulating Droplets by Electrowetting-Based Techniques," issued on Jun. 28, 2005; Pamula et al., U.S. patent application Ser. No. 11/343,284, entitled "Apparatuses and Methods for Manipulating Droplets on a Printed Circuit Board," filed on filed on Jan. 30, 2006; Pollack et al., International Patent Application No. PCT/US2006/047486, entitled "Droplet-Based Biochemistry," filed on Dec. 11, 2006; Shenderov, U.S. Pat. No. 6,773,566, entitled "Electrostatic Actuators for Microfluidics and Methods for Using Same," issued on Aug. 10, 2004 and U.S. Pat. No. 6,565,727, entitled "Actuators for Microfluidics Without Moving Parts," issued on Jan. 24, 2000; Kim and/or Shah et al., U.S. patent application Ser. No. 10/343,261, entitled "Electrowetting-driven Micropumping," filed on Jan. 27, 2003, Ser. No. 11/275,668, entitled "Method and Apparatus for Promoting the Complete Transfer of Liquid Drops from a Nozzle," filed on Jan. 23, 2006, Ser. No. 11/460,188, entitled "Small Object Moving on Printed Circuit Board," filed on Jan. 23, 2006, Ser. No. 12/465,935, entitled "Method for Using Magnetic Particles in Droplet Microfluidics," filed on May 14, 2009, and Ser. No. 12/513,157, entitled "Method and Apparatus for Real-time Feedback Control of Electrical Manipulation of Droplets on Chip," filed on Apr. 30, 2009; Velev, U.S. Pat. No. 7,547,380, entitled "Droplet Transportation Devices and Methods Having a Fluid Surface," issued on Jun. 16, 2009; Sterling et al., U.S. Pat. No. 7,163,612, entitled "Method, Apparatus and Article for Microfluidic Control via Electrowetting, for Chemical, Biochemical and Biological Assays and the Like," issued on Jan. 16, 2007; Becker and Gascoyne et al., U.S. Pat. Nos. 7,641,779, entitled "Method and Apparatus for Programmable fluidic Processing," issued on Jan. 5, 2010, and U.S. Pat. No. 6,977,033, entitled "Method and Apparatus for Programmable fluidic Processing," issued on Dec. 20, 2005; Decre et al., U.S. Pat. No. 7,328,979, entitled "System for Manipulation of a Body of Fluid," issued on Feb. 12, 2008; Yamakawa et al., U.S. Patent Pub. No. 20060039823, entitled "Chemical Analysis Apparatus," published on Feb. 23, 2006; Wu, International Patent Pub. No. WO/2009/003184, entitled "Digital Microfluidics Based Apparatus for Heat-exchanging Chemical Processes," published on Dec. 31, 2008; Fouillet et al., U.S. Patent Pub. No. 20090192044, entitled "Electrode Addressing Method," published on Jul. 30, 2009; Fouillet et al., U.S. Pat. No. 7,052,244, entitled "Device for Displacement of Small Liquid Volumes Along a Micro-catenary Line by Electrostatic Forces," issued on May 30, 2006; Marchand et al., U.S. Patent Pub. No. 20080124252, entitled "Droplet Microreactor," published on May 29, 2008; Adachi et al., U.S. Patent Pub. No. 20090321262, entitled "Liquid Transfer Device," published on Dec. 31, 2009; Roux et al., U.S. Patent Pub. No. 20050179746, entitled "Device for Controlling the Displacement of a Drop Between two or Several Solid Substrates," published on Aug. 18, 2005; Dhindsa et al., "Virtual Electrowetting Channels: Electronic Liquid Transport with Continuous Channel Functionality," Lab Chip, 10:832-836 (2010); the entire disclosures of which are incorporated herein by reference, along with their priority documents. Certain droplet actuators will include one or more substrates arranged with a droplet operations gap therebetween and electrodes associated with (e.g., layered on, attached to, and/or embedded in) the one or more substrates and arranged to conduct one or more droplet operations. For example, certain droplet actuators will include a base (or bottom) substrate, droplet operations electrodes associated with the substrate, one or more dielectric layers atop the substrate and/or electrodes, and optionally one or more hydrophobic layers atop the substrate, dielectric layers and/or the electrodes forming a droplet operations surface. A top substrate may also be provided, which is separated from the droplet operations surface by a gap, commonly referred to as a droplet operations gap. Various electrode arrangements on the top and/or bottom substrates are discussed in the above-referenced patents and applications and certain novel electrode arrangements are discussed in the description of the invention. During droplet operations it is preferred that droplets remain in continuous contact or frequent contact with a ground or reference electrode. A ground or reference electrode may be associated with the top substrate facing the gap, the bottom substrate facing the gap, in the gap. Where electrodes are provided on both substrates, electrical contacts for coupling the electrodes to a droplet actuator instrument for controlling or monitoring the electrodes may be associated with one or both plates. In some cases, electrodes on one substrate are electrically coupled to the other substrate so that only one substrate is in contact with the droplet actuator. In one embodiment, a conductive material (e.g., an epoxy, such as MASTER BOND™ Polymer System EP79, available from Master Bond, Inc., Hackensack, N.J.) provides the electrical connection between electrodes on one substrate and electrical paths on the other substrates, e.g., a ground electrode on a top substrate may be coupled to an electrical path on a bottom substrate by such a conductive material. Where multiple substrates are used, a spacer may be provided between the substrates to determine the height of the gap therebetween and define dispensing reservoirs. The spacer height may, for example, be from about 5 µm to about 600 µm, or about 100 µm to about 400 µm, or about 200 µm to about 350 µm, or about 250 µm to about 300 µm, or about 275 µm. The spacer may, for example, be formed of a layer of projections form the top or bottom substrates, and/or a material inserted between the top and bottom substrates. One or more openings may be provided in the one or more substrates for forming a fluid path through which liquid may be delivered into the droplet operations gap. The one or more openings may in some cases be aligned for interaction with one or more electrodes, e.g., aligned such that liquid flowed through the opening will come into sufficient proximity with one or more droplet operations electrodes to permit a droplet operation to be effected by the droplet operations electrodes using the liquid. The base (or bottom) and top substrates may in some cases be formed as one integral component. One or more reference electrodes may be provided on the base (or bottom) and/or top substrates and/or in the gap. Examples of reference electrode arrangements are provided in the above referenced patents and patent applications. In various embodiments, the manipulation of droplets by a droplet actuator may be electrode mediated, e.g., electrowetting mediated or dielectrophoresis mediated or Coulombic force mediated. Examples of other techniques for controlling droplet operations that may be used in the droplet actuators of the invention include using devices that induce hydrodynamic fluidic pressure, such as those that operate on the basis of mechanical principles (e.g. external syringe pumps, pneumatic membrane pumps, vibrating membrane pumps, vacuum devices, centrifugal forces, piezoelectric/ultrasonic pumps and acoustic forces); electrical or magnetic principles (e.g. electroosmotic flow, electrokinetic pumps, ferrofluidic plugs, electrohydrodynamic pumps, attraction or repulsion using magnetic forces and magnetohydrodynamic pumps); thermodynamic principles (e.g. gas bubble generation/phase-change-induced volume expansion); other kinds of surface-wetting principles (e.g. electrowetting, and opto-electrowetting, as well as chemically, thermally, structurally and radioactively induced surface-tension gradients); gravity; surface tension (e.g., capillary action); electrostatic forces (e.g., electroosmotic flow); centrifugal flow (substrate disposed on a compact disc and rotated); magnetic forces (e.g., oscillating ions causes flow); magnetohydrodynamic forces; and vacuum or pressure differential. In certain embodiments, combinations of two or more of the foregoing techniques may be employed to conduct a droplet operation in a droplet actuator of the invention. Similarly, one or more of the foregoing may be used to deliver liquid into a droplet operations gap, e.g., from a reservoir in another device or from an external reservoir of the droplet actuator (e.g., a reservoir associated with a droplet actuator substrate and a flow path from the reservoir into the droplet operations gap). Droplet operations surfaces of certain droplet actuators of the invention may be made from hydrophobic materials or may be coated or treated to make them hydrophobic. For example, in some cases some portion or all of the droplet operations surfaces may be derivatized with low surface-energy materials or chemistries, e.g., by deposition or using in situ synthesis using compounds such as poly- or perfluorinated compounds in solution or polymerizable monomers. Examples include TEFLON® AF (available from DuPont, Wilmington, Del.), members of the cytop family of materials, coatings in the FLUOROPEL® family of hydrophobic and superhydrophobic coatings (available from Cytonix Corporation, Beltsville, Md.), silane coatings, fluorosilane coatings, hydrophobic phosphonate derivatives (e.g., those sold by Aculon, Inc), and NOVEC™ electronic coatings (available from 3M Company, St. Paul, Minn.), other fluorinated monomers for plasma-enhanced chemical vapor deposition (PECVD), and organosiloxane (e.g., SiOC) for PECVD. In some cases, the droplet operations surface may include a hydrophobic coating having a thickness ranging from about 10 nm to about 1,000 nm. Moreover, in some embodiments, the top substrate of the droplet actuator includes an electrically conducting organic polymer, which is then coated with a hydrophobic coating or otherwise treated to make the droplet operations surface hydrophobic. For example, the electrically conducting organic polymer that is deposited onto a plastic substrate may be poly(3,4-ethylenedioxythiophene) poly(styrenesulfonate) (PEDOT: PSS). Other examples of electrically conducting organic polymers and alternative conductive layers are described in Pollack et al., International Patent Application No. PCT/US2010/040705, entitled "Droplet Actuator Devices and Methods," the entire disclosure of which is incorporated herein by reference. One or both substrates may be fabricated using a printed circuit board (PCB), glass, indium tin oxide (ITO)-coated glass, and/or semiconductor materials as the substrate. When the substrate is ITO-coated glass, the ITO coating is preferably a thickness in the range of about 20 to about 200 nm, preferably about 50 to about 150 nm, or about 75 to about 125 nm, or about 100 nm. In some cases, the top and/or bottom substrate includes a PCB substrate that is coated with a dielectric, such as a polyimide dielectric, which may in some cases also be coated or otherwise treated to make the droplet operations surface hydrophobic. When the substrate includes a PCB, the following materials are examples of suitable materials: MITSUI™ BN-300 (available from MITSUI Chemicals America, Inc., San Jose Calif.); ARLON™ 11N (available from Arlon, Inc, Santa Ana, Calif.); NELCO® N4000-6 and N5000-30/32 (available from Park Electrochemical Corp., Melville, N.Y.); ISOLA™ FR406 (available from Isola Group, Chandler, Ariz.), especially IS620; fluoropolymer family (suitable for fluorescence detection since it has low background fluorescence); polyimide family; polyester; polyethylene naphthalate; polycarbonate; polyetheretherketone; liquid crystal polymer; cyclo-olefin copolymer (COC); cyclo-olefin polymer (COP); aramid; THERMOUNT® non-woven aramid reinforcement (available from DuPont, Wilmington, Del.); NOMEX® brand fiber (available from DuPont, Wilmington, Del.); and paper. Various materials are also suitable for use as the dielectric component of the substrate. Examples include: vapor deposited dielectric, such as PARYLENE™ C (especially on glass), PARYLENE™ N, and PARYLENE™ HT (for high temperature, ~300° C.) (available from Parylene Coating Services, Inc., Katy, Tex.); TEFLON® AF coatings; cytop; soldermasks, such as liquid photoimageable soldermasks (e.g., on PCB) like TAIYO™ PSR4000 series, TAIYO™ PSR and AUS series (available from Taiyo America, Inc. Carson City, Nev.) (good thermal characteristics for applications involving thermal control), and PROBIMER™ 8165 (good thermal characteristics for applications involving thermal control (available from Huntsman Advanced Materials Americas Inc., Los Angeles, Calif.); dry film soldermask, such as those in the VACREL® dry film soldermask line (available from DuPont, Wilmington, Del.); film dielectrics, such as polyimide film (e.g., KAPTON® polyimide film, available from DuPont, Wilmington, Del.), polyethylene, and fluoropolymers (e.g., FEP), polytetrafluoroethylene; polyester; polyethylene naphthalate; cyclo-olefin copolymer (COC); cyclo-olefin polymer (COP); any other PCB substrate material listed above; black matrix resin; and polypropylene. Droplet transport voltage and frequency may be selected for performance with reagents used in specific assay protocols. Design parameters may be varied, e.g., number and placement of on-actuator reservoirs, number of independent electrode connections, size (volume) of different reservoirs, placement of magnets/bead washing zones, electrode size, inter-electrode pitch, and gap height (between top and bottom substrates) may be varied for use with specific reagents, protocols, droplet volumes, etc. In some cases, a substrate of the invention may derivatized with low surface-energy materials or chemistries, e.g., using deposition or in situ synthesis using poly- or per-fluorinated compounds in solution or polymerizable monomers. Examples include TEFLON® AF coatings and FLUOROPEL® coatings for dip or spray coating, other fluorinated monomers for plasma-enhanced chemical vapor deposition (PECVD), and organosiloxane (e.g., SiOC) for PECVD. Additionally, in some cases, some portion or all of the droplet operations surface may be coated with a substance for reducing background noise, such as background fluorescence from a PCB substrate. For example, the noise-reducing coating may include a black matrix resin, such as the black matrix resins available from Toray industries, Inc., Japan. Electrodes of a droplet actuator are typically controlled by a controller or a processor, which is itself provided as part of a system, which may include processing functions as well as data and software storage and input and output capabilities. Reagents may be provided on the droplet actuator in the droplet operations gap or in a reservoir fluidly coupled to the droplet operations gap. The reagents may be in liquid form, e.g., droplets, or they may be provided in a reconstitutable form in the droplet operations gap or in a reservoir fluidly coupled to the droplet operations gap. Reconstitutable reagents may typically be combined with liquids for reconstitution. An example of reconstitutable reagents suitable for use with the invention includes those described in Meathrel, et al., U.S. Pat. No. 7,727,466, entitled "Disintegratable films for diagnostic devices," granted on Jun. 1, 2010.

"Droplet operation" means any manipulation of a droplet on a droplet actuator. A droplet operation may, for example, include: loading a droplet into the droplet actuator; dispensing one or more droplets from a source droplet; splitting, separating or dividing a droplet into two or more droplets; transporting a droplet from one location to another in any direction; merging or combining two or more droplets into a single droplet; diluting a droplet; mixing a droplet; agitating a droplet; deforming a droplet; retaining a droplet in position; incubating a droplet; heating a droplet; vaporizing a droplet; cooling a droplet; disposing of a droplet; transporting a droplet out of a droplet actuator; other droplet operations described herein; and/or any combination of the foregoing. The terms "merge," "merging," "combine," "combining" and the like are used to describe the creation of one droplet from two or more droplets. It should be understood that when such a term is used in reference to two or more droplets, any combination of droplet operations that are sufficient to result in the combination of the two or more droplets into one droplet may be used. For example, "merging droplet A with droplet B," can be achieved by transporting droplet A into contact with a stationary droplet B, transporting droplet B into contact with a stationary droplet A, or transporting droplets A and B into contact with each other. The terms "splitting," "separating" and "dividing" are not intended to imply any particular outcome with respect to volume of the resulting droplets (i.e., the volume of the resulting droplets can be the same or different) or number of resulting droplets (the number of resulting droplets may be 2, 3, 4, 5 or more). The term "mixing" refers to droplet operations which result in more homogenous distribution of one or more components within a droplet. Examples of "loading" droplet operations include microdialysis loading, pressure assisted loading, robotic loading, passive loading, and pipette loading. Droplet operations may be electrode-mediated. In some cases, droplet operations are further facilitated by the use of hydrophilic and/or hydrophobic regions on surfaces and/or by physical obstacles. For examples of droplet operations, see the patents and patent applications cited above under the definition of "droplet actuator." Impedance or capacitance sensing or imaging techniques may sometimes be used to determine or confirm the outcome of a droplet operation. Examples of such techniques are described in Sturmer et al., International Patent Pub. No. WO/2008/101194, entitled "Capacitance Detection in a Droplet Actuator," published on Aug. 21, 2008, the entire disclosure of which is incorporated herein by reference. Generally speaking, the sensing or imaging techniques may be used to confirm the presence or absence of a droplet at a specific electrode. For example, the presence of a dispensed droplet at the destination electrode following a droplet dispensing operation confirms that the droplet dispensing operation was effective. Similarly, the presence of a droplet at a detection spot at an appropriate step in an assay protocol may confirm that a previous set of droplet operations has successfully produced a droplet for detection. Droplet transport time can be quite fast. For example, in various embodiments, transport of a droplet from one electrode to the next may exceed about 1 sec, or about 0.1 sec, or about 0.01 sec, or about 0.001 sec. In one embodiment, the electrode is operated in AC mode but is switched to DC mode for imaging. It is helpful for conducting droplet operations for the footprint area of droplet to be similar to electrowetting area; in other words, 1×-, 2×-3×-droplets are usefully controlled operated using 1, 2, and 3 electrodes, respectively. If the droplet footprint is greater than the number of electrodes available for conducting a droplet operation at a given time, the difference between the droplet size and the number of electrodes should typically not be greater than 1; in other words, a 2× droplet is usefully controlled using 1 electrode and a 3× droplet is usefully controlled using 2 electrodes. When droplets include beads, it is useful for droplet size to be equal to the number of electrodes controlling the droplet, e.g., transporting the droplet.

"Filler fluid" means a fluid associated with a droplet operations substrate of a droplet actuator, which fluid is sufficiently immiscible with a droplet phase to render the droplet phase subject to electrode-mediated droplet operations. For example, the droplet operations gap of a droplet actuator is typically filled with a filler fluid. The filler fluid may, for example, be or include a low-viscosity oil, such as silicone oil or hexadecane filler fluid. The filler fluid may be or include a halogenated oil, such as a fluorinated or perfluorinated oil. The filler fluid may fill the entire gap of the droplet actuator or may coat one or more surfaces of the droplet actuator. Filler fluids may be conductive or nonconductive. Filler fluids may be selected to improve droplet operations and/or reduce loss of reagent or target substances from droplets, improve formation of microdroplets, reduce cross contamination between droplets, reduce contamination of droplet actuator surfaces, reduce degradation of droplet actuator materials, etc. For example, filler fluids may be selected for compatibility with droplet actuator materials. As an example, fluorinated filler fluids may be usefully employed with fluorinated surface coatings. Fluorinated filler fluids are useful to reduce loss of lipophilic compounds, such as umbelliferone substrates like 6-hexadecanoylamido-4-methylumbelliferone substrates (e.g., for use in Krabbe, Niemann-Pick, or other assays); other umbelliferone substrates are described in U.S. Patent Pub. No. 20110118132, published on May 19, 2011, the entire disclosure of which is incorporated herein by reference. Examples of suitable fluorinated oils include those in the Galden line, such as Galden HT170 (bp=170° C., viscosity=1.8 cSt, density=1.77), Galden HT200 (bp=200C, viscosity=2.4 cSt, d=1.79), Galden HT230 (bp=230C, viscosity=4.4 cSt, d=1.82) (all from Solvay Solexis); those in the Novec line, such as Novec 7500 (bp=128C, viscosity=0.8 cSt, d=1.61), Fluorinert FC-40 (bp=155° C., viscosity=1.8 cSt, d=1.85), Fluorinert FC-43 (bp=174° C., viscosity=2.5 cSt, d=1.86) (both from 3M). In general, selection of perfluorinated filler fluids is based on kinematic viscosity (<7 cSt is preferred, but not required), and on boiling point (>150° C. is preferred, but not required, for use in DNA/RNA-based applications (PCR, etc.)). Filler fluids may, for example, be doped with surfactants or other additives. For example, additives may be selected to improve droplet operations and/or reduce loss of reagent or target substances from droplets, formation of microdroplets, cross contamination between droplets, contamination of droplet actuator surfaces, degradation of droplet actuator materials, etc. Composition of the filler fluid, including surfactant doping, may be selected for performance with reagents used in the specific assay protocols and effective interaction or non-interaction with droplet actuator materials. Examples of filler fluids and filler fluid formulations suitable for use with the invention are provided in Srinivasan et al, International Patent Pub. Nos. WO/2010/027894, entitled "Droplet Actuators, Modified Fluids and Methods," published on Mar. 11, 2010, and WO/2009/021173, entitled "Use of Additives for Enhancing Droplet Operations," published on Feb. 12, 2009; Sista et al., International Patent Pub. No. WO/2008/098236, entitled "Droplet Actuator Devices and Methods Employing Magnetic Beads," published on Aug. 14, 2008; and Monroe et al., U.S. Patent Publication No. 20080283414, entitled "Electrowetting Devices," filed on May 17, 2007; the entire disclosures of which are incorporated herein by reference, as well as the other patents and patent applications cited herein. Fluorinated oils may in some cases be doped with fluorinated surfactants, e.g., Zonyl FSO-100 (Sigma-Aldrich) and/or others.

"Immobilize" with respect to magnetically responsive beads, means that the beads are substantially restrained in position in a droplet or in filler fluid on a droplet actuator. For example, in one embodiment, immobilized beads are sufficiently restrained in position in a droplet to permit execution of a droplet splitting operation, yielding one droplet with substantially all of the beads and one droplet substantially lacking in the beads.

"Magnetically responsive" means responsive to a magnetic field. "Magnetically responsive beads" include or are composed of magnetically responsive materials. Examples of magnetically responsive materials include paramagnetic materials, ferromagnetic materials, ferrimagnetic materials, and metamagnetic materials. Examples of suitable paramagnetic materials include iron, nickel, and cobalt, as well as metal oxides, such as $Fe_3O_4$, $BaFe_{12}O_{19}$, CoO, NiO, $Mn_2O_3$, $Cr_2O_3$, and CoMnP.

"Reservoir" means an enclosure or partial enclosure configured for holding, storing, or supplying liquid. A droplet actuator system of the invention may include on-cartridge reservoirs and/or off-cartridge reservoirs. On-cartridge reservoirs may be (1) on-actuator reservoirs, which are reservoirs in the droplet operations gap or on the droplet operations surface; (2) off-actuator reservoirs, which are reservoirs on the droplet actuator cartridge, but outside the droplet operations gap, and not in contact with the droplet operations surface; or (3) hybrid reservoirs which have on-actuator regions and off-actuator regions. An example of an off-actuator reservoir is a reservoir in the top substrate. An off-actuator reservoir is typically in fluid communication with an opening or flow path arranged for flowing liquid from the off-actuator reservoir into the droplet operations gap, such as into an on-actuator reservoir. An off-cartridge reservoir may be a reservoir that is not part of the droplet actuator cartridge at all, but which flows liquid to some portion of the droplet actuator cartridge. For example, an off-cartridge reservoir may be part of a system or docking station to which the droplet actuator cartridge is coupled during operation. Similarly, an off-cartridge reservoir may be a reagent storage container or syringe which is used to force fluid into an on-cartridge reservoir or into a droplet operations gap. A system using an off-cartridge reservoir will typically include a fluid passage means whereby liquid may be transferred from the off-cartridge reservoir into an on-cartridge reservoir or into a droplet operations gap.

"Transporting into the magnetic field of a magnet," "transporting towards a magnet," and the like, as used herein to refer to droplets and/or magnetically responsive beads within droplets, is intended to refer to transporting into a region of a magnetic field capable of substantially attracting magnetically responsive beads in the droplet. Similarly, "transporting away from a magnet or magnetic field," "transporting out of the magnetic field of a magnet," and the like, as used herein to refer to droplets and/or magnetically responsive beads within droplets, is intended to refer to transporting away from a region of a magnetic field capable of substantially attracting magnetically responsive beads in the droplet, whether or not the droplet or magnetically responsive beads is completely removed from the magnetic field. It will be appreciated that in any of such cases described herein, the droplet may be transported towards or away from the desired region of the magnetic field, and/or the desired region of the magnetic field may be moved towards or away from the droplet. Reference to an electrode, a droplet, or magnetically responsive beads being "within" or "in" a magnetic field, or the like, is intended to describe a situation in which the electrode is situated in a manner which permits the electrode to transport a droplet into and/or away from a desired region of a magnetic field, or the droplet or magnetically responsive beads is/are situated in a desired region of the magnetic field, in each case where the magnetic field in the desired region is capable of substantially attracting any magnetically responsive beads in the droplet. Similarly, reference to an electrode, a droplet, or magnetically responsive beads being "outside of" or "away from" a magnetic field, and the like, is intended to describe a situation in which the electrode is situated in a manner which permits the electrode to transport a droplet away from a certain region of a magnetic field, or the droplet or magnetically responsive beads is/are situated away from a certain region of the magnetic field, in each case where the magnetic field in such region is not capable of substantially attracting any magnetically responsive beads in the droplet or in which any remaining attraction does not eliminate the effectiveness of droplet operations conducted in the region. In various aspects of the invention, a system, a droplet actuator, or another component of a system may include a magnet, such as one or more permanent magnets (e.g., a single cylindrical or bar magnet or an array of such magnets, such as a Halbach array) or an electromagnet or array of electromagnets, to form a magnetic field for interacting with magnetically responsive beads or other components on chip. Such interactions may, for example, include substantially immobilizing or restraining movement or flow of magnetically responsive beads during storage or in a droplet during a droplet operation or pulling magnetically responsive beads out of a droplet.

"Washing" with respect to washing a bead means reducing the amount and/or concentration of one or more substances in contact with the bead or exposed to the bead from a droplet in contact with the bead. The reduction in the amount and/or concentration of the substance may be partial, substantially complete, or even complete. The substance may be any of a wide variety of substances; examples include target substances for further analysis, and unwanted substances, such as components of a sample, contaminants, and/or excess reagent. In some embodiments, a washing operation begins with a starting droplet in contact with a magnetically responsive bead, where the droplet includes an initial amount and initial concentration of a substance. The washing operation may proceed using a variety of droplet operations. The washing operation may yield a droplet including the magnetically responsive bead, where the droplet has a total amount and/or concentration of the substance which is less than the initial amount and/or concentration of the substance. Examples of suitable washing techniques are described in Pamula et al., U.S. Pat. No. 7,439,014, entitled "Droplet-Based Surface Modification and Washing," granted on Oct. 21, 2008, the entire disclosure of which is incorporated herein by reference.

The terms "top," "bottom," "over," "under," and "on" are used throughout the description with reference to the relative positions of components of the droplet actuator, such as relative positions of top and bottom substrates of the droplet actuator. It will be appreciated that the droplet actuator is functional regardless of its orientation in space.

When a liquid in any form (e.g., a droplet or a continuous body, whether moving or stationary) is described as being "on", "at", or "over" an electrode, array, matrix or surface, such liquid could be either in direct contact with the electrode/array/matrix/surface, or could be in contact with one or more layers or films that are interposed between the liquid and the electrode/array/matrix/surface. In one example, filler fluid can be considered as a film between such liquid and the electrode/array/matrix/surface.

When a droplet is described as being "on" or "loaded on" a droplet actuator, it should be understood that the droplet is arranged on the droplet actuator in a manner which facilitates using the droplet actuator to conduct one or more droplet operations on the droplet, the droplet is arranged on the droplet actuator in a manner which facilitates sensing of a property of or a signal from the droplet, and/or the droplet has been subjected to a droplet operation on the droplet actuator.

DESCRIPTION

The present invention is directed to methods of improving accuracy and precision of droplet metering using an on-actuator reservoir as the fluid input. In some embodiments, the on-actuator reservoir that is used for metering droplets includes a loading port, a liquid storage zone, a droplet metering zone, and a droplet dispensing zone. The on-actuator reservoir is designed to prevent liquid flow-back into the loading port and to prevent liquid from flooding into the droplet operations gap in the dispensing zone.

7.1 On-Actuator Reservoirs

Figure 1:
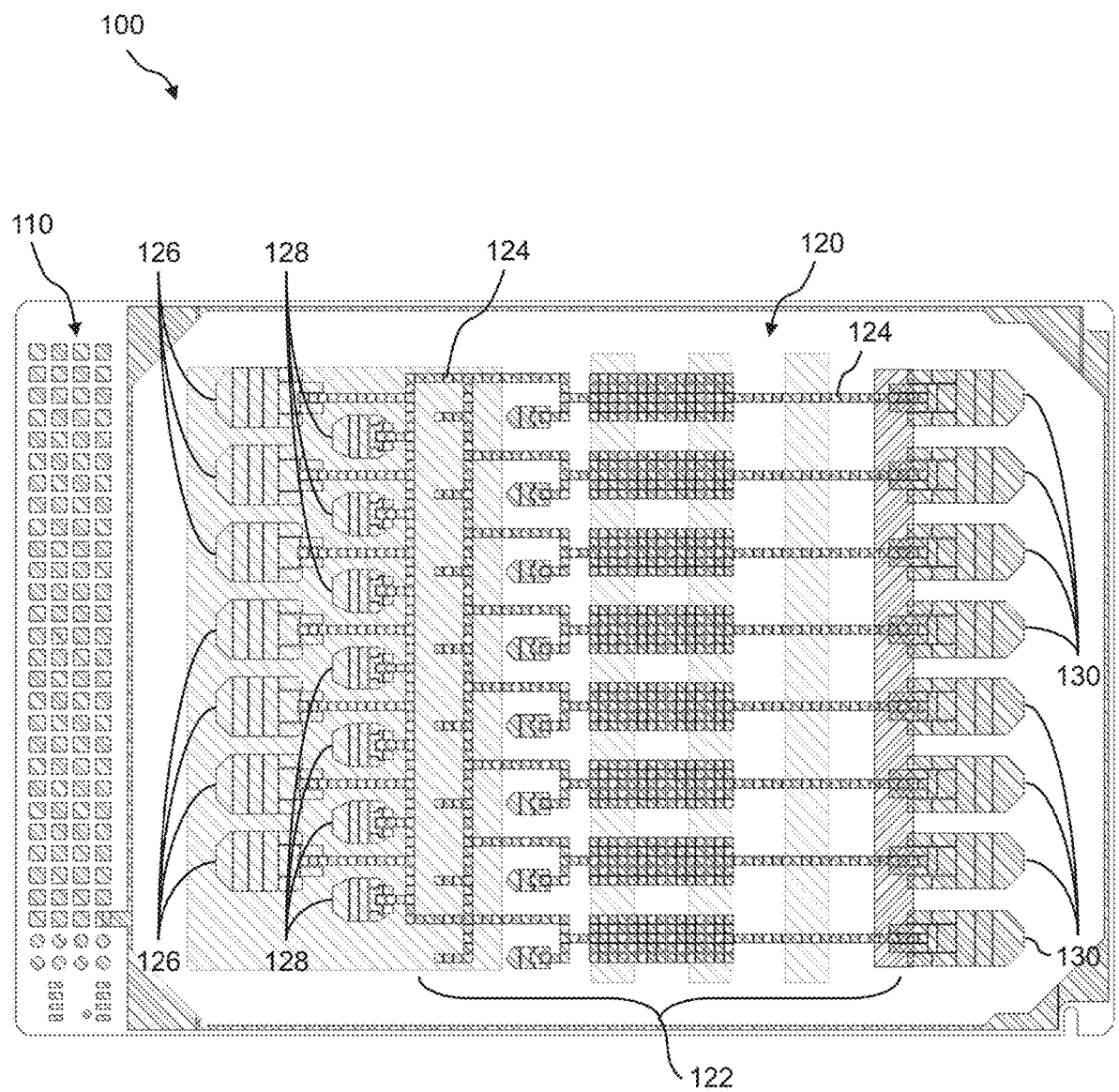
FIG. 1 illustrates a top down view of a bottom substrate of a droplet actuator that includes electrode arrangements that support on-actuator reservoirs for accurately metering droplets.

FIG. 1 illustrates a top down view of a bottom substrate 100 of a droplet actuator (not shown) that includes electrode arrangements that support on-actuator reservoirs for accurately metering droplets. For example, bottom substrate 100 includes a set of power/signal I/O pads 110 patterned at one end thereof, as shown. An electrode arrangement 120 is also patterned on bottom substrate 100. Electrode arrangement 120 includes a droplet processing region 122 that includes, for example, a plurality of droplet processing lanes that are formed by and fluidly connected by various arrangements of droplet operations electrodes 124 (e.g., electrowetting electrodes). In one embodiment, the plurality of droplet processing lanes comprise eight droplet processing lanes. Additionally, various reservoirs (e.g., sample and reagent reservoirs) may supply droplet processing region 122. For example, electrode arrangement 120 includes a plurality of sets of reservoir electrodes 126, wherein each set of reservoir electrodes 126 supports an on-actuator reservoir, an example of which is shown and described with reference to FIGS. 2A and 2B. In one embodiment, the plurality of sets of reservoir electrodes 126 comprise seven sets of reservoir electrodes 126. Electrode arrangement 120 also includes a plurality of sets of reservoir electrodes 128, wherein each set of reservoir electrodes 128 supports an on-actuator reservoir, an example of which is shown and described with reference to FIGS. 3A and 3B. Further, droplet processing region 122 supplies certain collection or waste reservoirs. Accordingly, droplet processing region 122 supplies a plurality of sets of reservoir electrodes 130, wherein each set of reservoir electrodes 130 supports an on-actuator reservoir (not shown). In one embodiment, the plurality of sets of reservoir electrodes 130 comprise eight sets of reservoir electrodes 130

In electrode arrangement 120, each set of reservoir electrodes 126 and reservoir electrodes 128 supports an on-actuator reservoir that is designed for improving the accuracy and precision of droplet metering (i.e., droplet dispensing) into, for example, the droplet processing region 122 of a droplet actuator (not shown). More details of embodiments of on-actuator reservoirs that are designed for improving the accuracy and precision of droplet metering are described below with reference to FIGS. 2A, 2B, 3A, 3B, and 4.

Figures 2A, 2B:
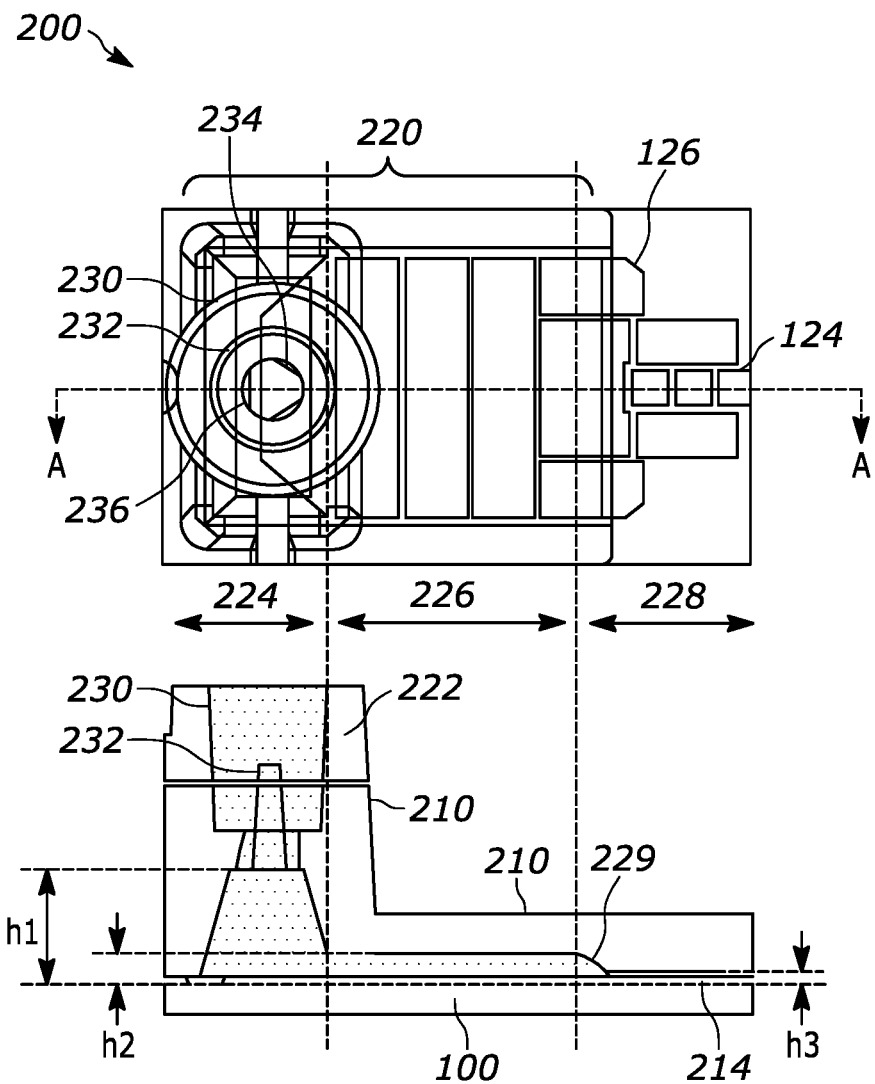
FIGS. 2A and 2B illustrate a top down view and a cross-sectional view, respectively, of a portion of a droplet actuator, which shows an example of an on-actuator reservoir for accurately metering droplets.

FIGS. 2A and 2B illustrate a top down view and a cross-sectional view, respectively, of a portion of a droplet actuator 200, which shows an embodiment of an on-actuator reservoir for accurately metering droplets. Namely, FIG. 2B is a cross-sectional view taken along line A-A of FIG. 2A. Droplet actuator 200 may include the bottom substrate 100 of FIG. 1 along with a top substrate 212. Bottom substrate 100 and top substrate 212 are separated by a droplet operations gap 214. Droplet operations are conducted in the droplet operations gap 214 on a droplet operations surface. Droplet actuator 200 includes the electrode arrangement 120 disposed on bottom substrate 100, whereas the electrode arrangement 120 includes the droplet operations electrodes 124. A ground reference electrode (not shown) may be disposed on top substrate 212. Droplet operations electrodes 124 and the ground reference electrode are arranged for conducting droplet operations.

The portion of droplet actuator 200 shown in FIGS. 2A and 2B corresponds to one of the sets of reservoir electrodes 126 of bottom substrate 100 shown in FIG. 1. Namely, an on-actuator reservoir 220 is formed in top substrate 212 at each set of reservoir electrodes 126. The on-actuator reservoir 220 includes a loading port 222, a storage zone 224, a metering zone 226, and a dispensing zone 228. In one embodiment, the metering zone 226 is a bulk liquid metering zone. The storage zone 224, metering zone 226, and dispensing zone 228 are characterized by different gap heights (i.e., different heights of the droplet operations gap 214 in these zones). For example, storage zone 224 has a height h1, metering zone 226 has a height h2, and dispensing zone 228 has a height h3, wherein h1>h2>h3. In one embodiment, height h1 is about 3 mm, height h2 is about 800 µm, and height h3 is about 300 µm.

In one embodiment, there is a transition region 229 in top substrate 212 for transitioning the gap height from metering zone 226 to dispensing zone 228. In transition region 229, there may be a slope in the surface of the top substrate 212 that is facing the droplet operations gap 214. In one embodiment, this slope is about 45 degrees.

Further, loading port 222 includes a cup portion 230 for holding a volume of liquid, wherein the cup portion 230 is fitted upon an upwardly protruding outlet portion 232. The upper portion of the cup portion 230 is enclosed, but has an opening 234 therein. In one embodiment, opening 234 of cup portion 230 of loading port 222 is substantially triangular in footprint. The outlet portion 232 has an opening 236 therein. In one embodiment, opening 236 of outlet portion 232 of loading port 222 is substantially circular in footprint. When in use, the cup portion 230 of loading port 222 must be filled with liquid at least up to the height of the outlet portion 232 of loading port 222 in order for liquid to flow through opening 236 and into the droplet operations gap 214. A pressure loading source can be coupled to opening 234 of cup portion 230 of loading port 222. Liquid can fill the cup portion 230 at least up to the height of the outlet portion 232 of loading port 222 in order for liquid to flow through opening 236 and into the droplet operations gap 214.

The relationship of the reservoir electrodes 126 to on-actuator reservoir 220 is such that the larger segments of the reservoir electrodes 126 are oriented toward the storage zone 224 of on-actuator reservoir 220 and the smaller segments of the reservoir electrodes 126 are oriented toward the dispensing zone 228 of on-actuator reservoir 220, which feeds the droplet operations electrodes 124, as shown.

Figure 3A:
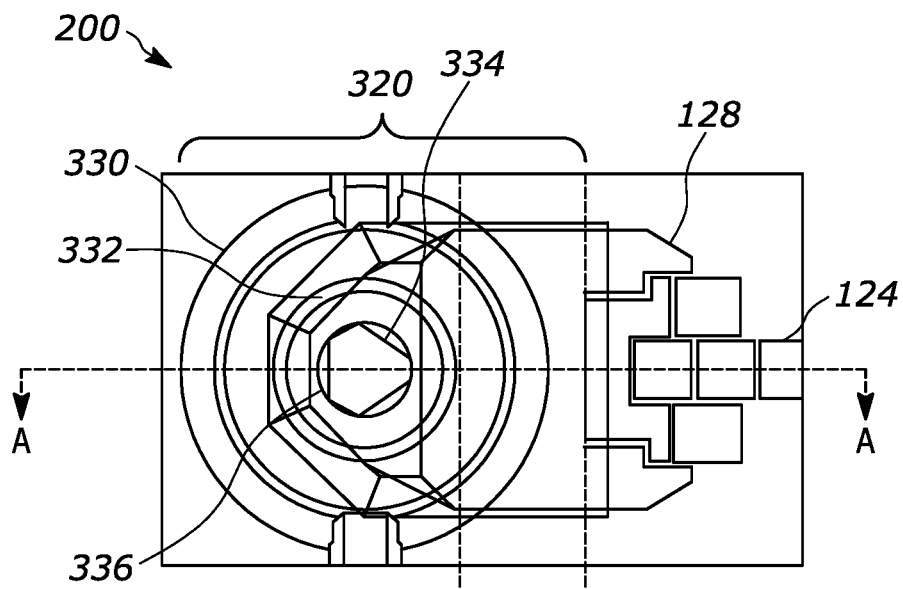
FIGS. 3A and 3B illustrate a top down view and a cross-sectional view, respectively, of another portion of the droplet actuator, which shows another example of an on-actuator reservoir for accurately metering droplets.
Figure 3B:
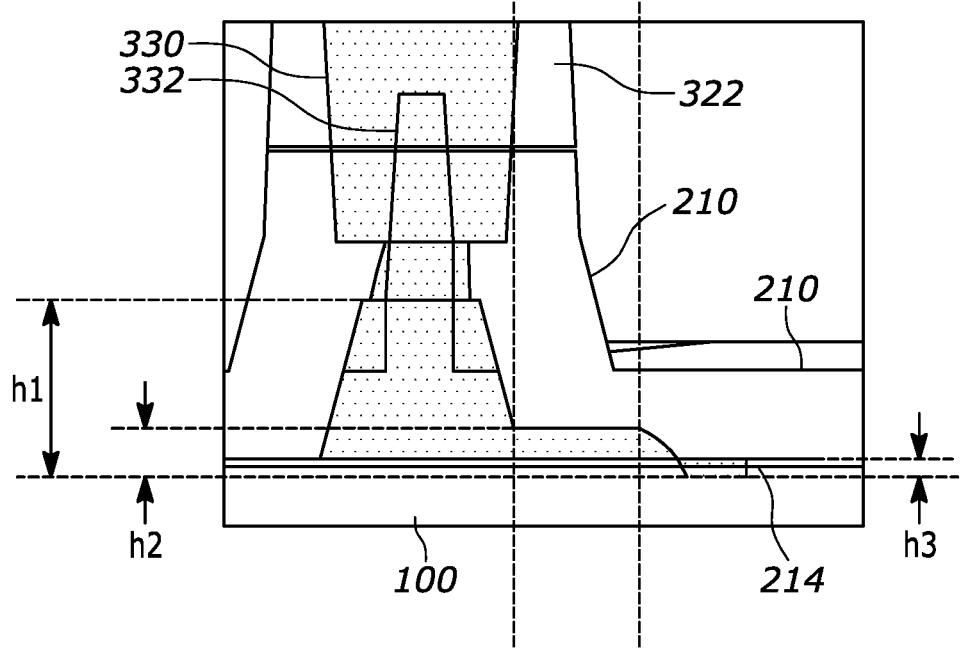

FIGS. 3A and 3B illustrate a top down view and a cross-sectional view, respectively, of another portion of droplet actuator 200, which shows another embodiment of an on-actuator reservoir for accurately metering droplets. Namely, FIG. 3B is a cross-sectional view taken along line A-A of FIG. 3A.

The portion of droplet actuator 200 shown in FIGS. 3A and 3B corresponds to one of the sets of reservoir electrodes 128 of bottom substrate 100 shown in FIG. 1. Namely, an on-actuator reservoir 320 is formed in top substrate 212 at each set of reservoir electrodes 128. The on-actuator reservoir 320 includes a loading port 322, a storage zone 324, a metering zone 326, and a dispensing zone 328. In one embodiment, the metering zone 326 is a bulk liquid metering zone. The storage zone 324, metering zone 326, and dispensing zone 328 are characterized by different gap heights (i.e., different heights of the droplet operations gap 214 in these zones). For example, storage zone 324 has a height h1, metering zone 326 has a height h2, and dispensing zone 328 has a height h3, wherein h1>h2>h3. In one embodiment, height h1 is about 3 mm, height h2 is about 800 and height h3 is about 300 µm.

Further, loading port 322 includes a cup portion 330 for holding a volume of liquid, wherein the cup portion 330 is fitted upon an upwardly protruding outlet portion 332. The upper portion of the cup portion 330 is enclosed, but has an opening 334 therein. In one embodiment, opening 334 of cup portion 330 of loading port 322 is substantially triangular in footprint. The outlet portion 332 has an opening 336 therein. In one embodiment, opening 336 of outlet portion 332 of loading port 322 is substantially circular in footprint. When in use, the cup portion 330 of loading port 322 must be filled with liquid at least up to the height of the outlet portion 332 of loading port 322 in order for liquid to flow through opening 336 and into the droplet operations gap 214. A pressure loading source can be coupled to opening 334 of cup portion 330 of loading port 322. Liquid can fill the cup portion 330 at least up to the height of the outlet portion 332 of loading port 322 in order for liquid to flow through opening 336 and into the droplet operations gap 214.

The relationship of the reservoir electrodes 128 to on-actuator reservoir 320 is such that the larger segments of the reservoir electrodes 128 are oriented toward the storage zone 324 of on-actuator reservoir 320 and the smaller segments of the reservoir electrodes 128 are oriented toward the dispensing zone 328 of on-actuator reservoir 320, which feeds the droplet operations electrodes 124, as shown.

The on-actuator reservoir 220 of FIGS. 2A and 2B and on-actuator reservoir 320 of FIGS. 3A and 3B are sized differently as shown by the different sized layouts of reservoir electrodes 126 and reservoir electrodes 128 in FIG. 1. In this embodiment, the lengths of the storage zone 224, metering zone 226, and dispensing zone 228 of on-actuator reservoir 220 is different than the lengths of the storage zone 324, metering zone 326, and dispensing zone 328, respectively, of on-actuator reservoir 320. In one embodiment, the metering zone 326 is a bulk liquid metering zone. An embodiment of the specifications of on-actuator reservoir 220 of FIGS. 2A and 2B are shown below in Table 1. An embodiment of the specifications of on-actuator reservoir 320 of FIGS. 3A and 3B are shown below in Table 2.

embodiment, the metering zone 426 is a bulk liquid metering zone. The storage zone 424, metering zone 426, and dispensing zone 428 are characterized by different gap heights (i.e., different heights of the droplet operations gap 214 in these zones). For example, storage zone 424 has a height h1, metering zone 426 has a height h2, and dispensing zone 428 has a height h3, wherein h1>h2>h3.

Further, the upper portion of loading port 422 may be open and the lower portion of loading port 422 may have an outlet 430 that allows liquid to flow into the droplet operations gap 214. In one embodiment, outlet 430 of loading port 422 is designed for the tip of a pipette to be fitted tightly therein. In this way, the pipette tip can be used for pressure loading liquid into the droplet operations gap 214.

Referring now to FIGS. 1 through 4, there is a relationship between the length, width, and height of each of the dispensing zones (e.g., dispensing zones 226, 326, 426). For example, preferably the length of the dispensing zones is 1.5× the height h2, 2× the height h2, 2.5× the height h2, or 3× the height h2. Further, preferably the width of the dispensing zones is 1.5× the height h2, 2× the height h2, 2.5× the height h2, or 3× the height h2.

Additionally, the diameter of the openings leading from the loading ports (e.g., loading ports 222, 322, 422) into the storage zones (e.g., storage zones 224, 324, 424) are small enough compared to the liquid storage area to prevent liquid flow-back into the space above the storage zones. Further, the design of the loading ports (e.g., loading ports 222, 322, 422) and storage zones (e.g., storage zones 224, 324, 424) prevents liquid flow-back onto the outside surface of the top substrate (e.g., top substrate 212). Without liquid flow-back

TABLE 1

Example specifications of on-actuator reservoir 220

| Height h1 (μm) of storage zone 224 | Height h2 (μm) of metering zone 226 | Height h3 (μm) of dispensing zone 228 | Estimated capacity (μL) of on-actuator reservoir 220 |
|---|---|---|---|
| 3000 | 800 | 300 | 61.58 |
| 2400 | 800 | 300 | 45.17 |
| 2000 | 800 | 300 | 35.37 |
| 1600 | 1000 | 312.5 | 26.48 |
| 3000 | 1600 | 312.5 | 61.58 |
| 3000 | 1200 | 312.5 | 62.58 |
| 800 | 800 | 300 | |

TABLE 2

Example specifications of on-actuator reservoir 320

| Height h1 (μm) of storage zone 324 | Height h2 (μm) of metering zone 326 | Height h3 (μm) of dispensing zone 328 | Estimated capacity (μL) of on-actuator reservoir 320 |
|---|---|---|---|
| 3000 | 800 | 300 | 47.45 |
| 2400 | 800 | 300 | 33.25 |
| 2000 | 800 | 300 | 25.09 |
| 2000 | 1000 | 300 | 25.09 |
| 3000 | 1600 | 300 | 47.45 |
| 3000 | 1200 | 300 | 47.45 |
| 800 | 800 | 300 | |

Figure 4:
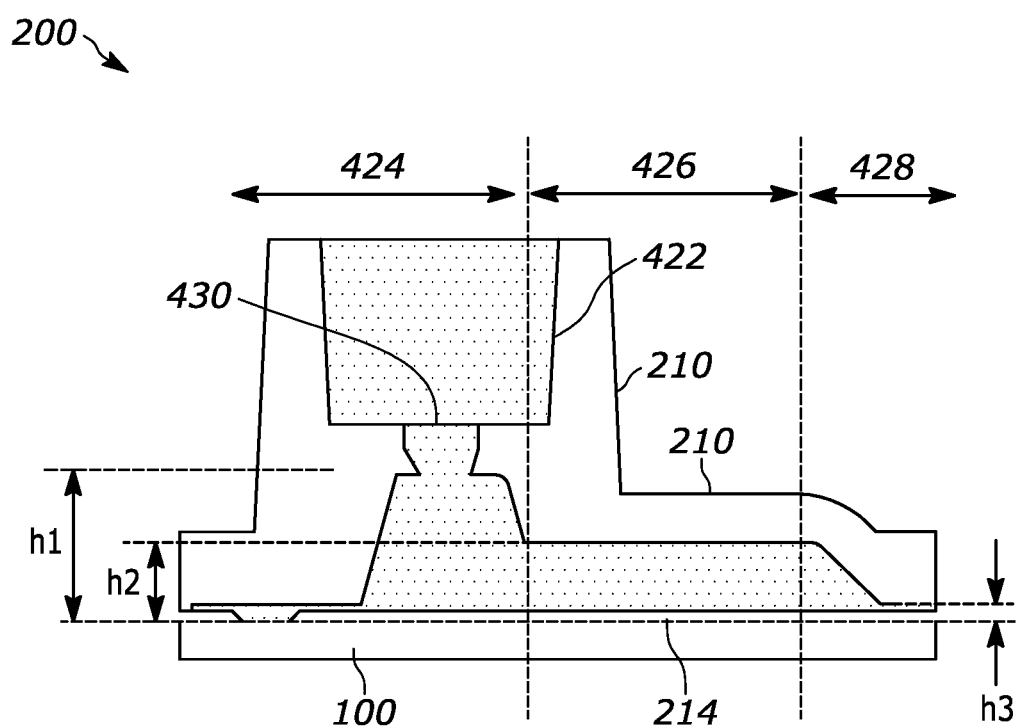
FIG. 4 illustrates a side view of another example of yet another portion of the droplet actuator, which shows yet another example of an on-actuator reservoir for accurately metering droplets.

FIG. 4 illustrates a side view of another embodiment of yet another portion of droplet actuator 200, which shows yet another embodiment of an on-actuator reservoir for accurately metering droplets. Namely, an on-actuator reservoir 420 is formed in top substrate 212. The on-actuator reservoir 420 includes a loading port 422, a storage zone 424, a metering zone 426, and a dispensing zone 428. In one onto the top substrate, the CYTOP coating (not shown) on the outside surface of the top substrate can be eliminated.

Referring now again to FIGS. 1 through 4, an embodiment of a method of using the presently disclosed on-actuator reservoirs for accurately metering droplets in a droplet actuator includes, but is not limited to, the following steps.

1. Coupling a pressure loading source to the loading fitting. In one embodiment, in FIGS. 2A and 2B, a pressure loading source is coupled to opening 234 of cup portion 230 of loading port 222. In another embodiment, in FIG. 4, coupling, a pressure loading source is coupled directly to outlet 430 of loading port 422.

2. Flowing into the storage zone sufficient liquid to fill the zone without causing liquid to flow into the dispensing zone or creating enough pressure to permit the liquid to escape through the fitting opening to the exterior of the droplet actuator. For example and referring now to FIGS. 2A and 2B, a sufficient amount of liquid is flowed into storage zone 224 to fill storage zone 224 without causing the liquid to flow into metering zone 226 and/or dispensing zone 228 or creating enough pressure to cause the liquid to escape back through the loading port 222 to the exterior of droplet actuator 200. In one embodiment, the metering zone 226 is a bulk liquid metering zone.

3. Metering sub-droplets from the stored liquid using electrodes in the metering zone to yield metered droplets. For example and referring now to FIGS. 2A and 2B, from the bulk liquid in storage zone 224, sub-droplets are metered into metering zone 226 using the reservoir electrodes 126 that are in metering zone 226 to yield metered droplets.

4. Dispensing sub-droplets from the metered droplets using electrodes in the dispensing zone. For example and referring now to FIGS. 2A and 2B, using reservoir electrodes 126 in dispensing zone 228, sub-droplets are dispensed onto the droplet operations electrodes 124 from the metered droplets that are in metering zone 226.

The present invention provides improved metering of droplets by maintaining relatively constant pressure of a larger volume of bulk liquid prior to droplet dispensing. In one embodiment, a single metering of a bulk liquid prior to droplet dispensing can comprise dispensing of a single droplet or can comprise dispensing of multiple droplets depending on the volume of the premetered bulk liquid. By limiting the sizes of input ports for liquid loading (i.e., the loading ports) and the storage zones, liquid flow-back onto the outside surface of the top substrate is prevented and the need for a hydrophobic coating on the on the outside surface of the top substrate is eliminated. Furthermore, the separation of functional zones in a single liquid reservoir can enable the implementation of modular changes in design (e.g., for increased liquid processing capacity and/or for different zone and gap heights) without the need for changing the entire droplet actuator and/or system design.

7.2 Systems

Figure 5:
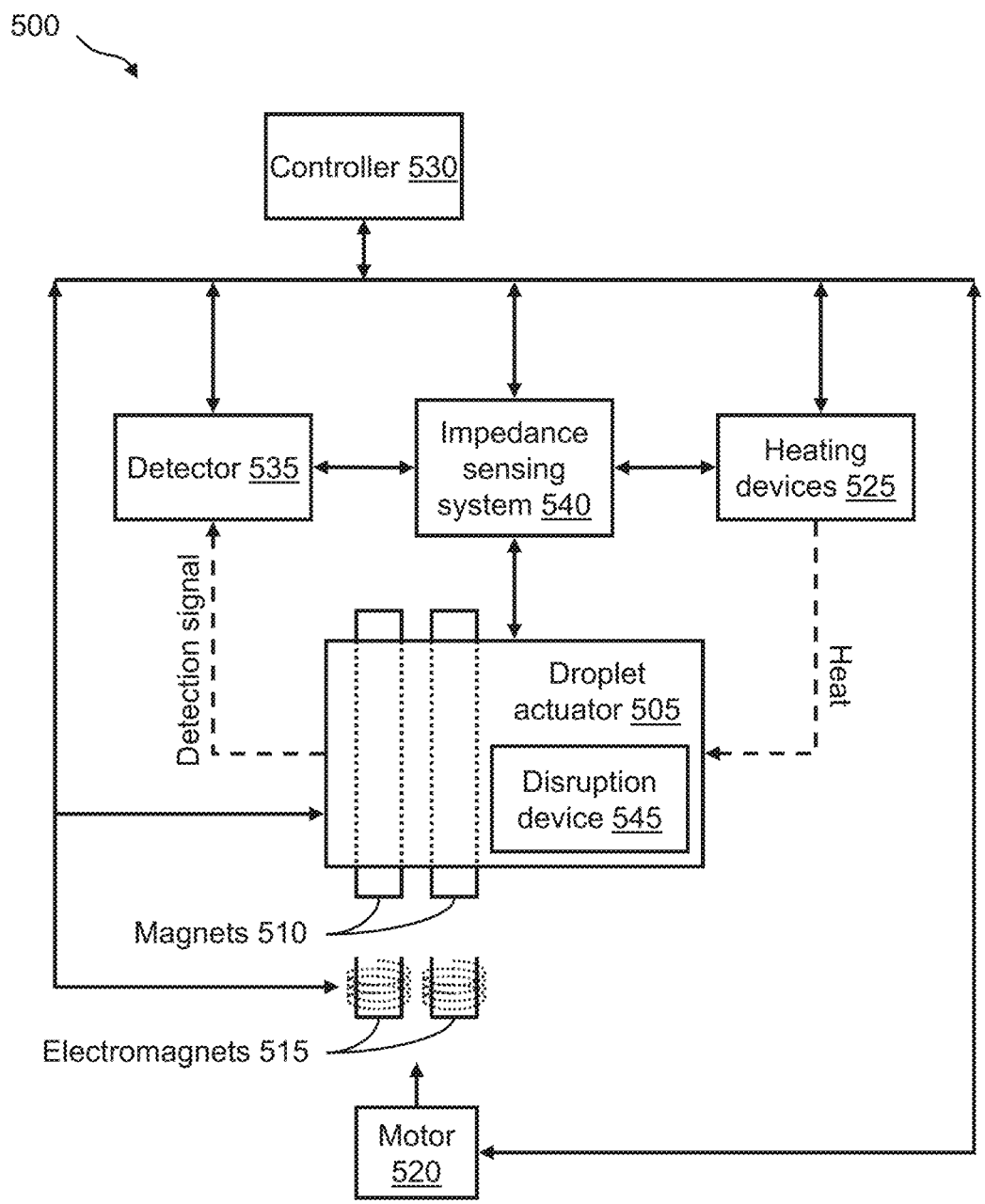
FIG. 5 illustrates a functional block diagram of an example of a microfluidics system that includes a droplet actuator.

FIG. 5 illustrates a functional block diagram of an embodiment of a microfluidics system 530 that includes a droplet actuator 505. Digital microfluidic technology conducts droplet operations on discrete droplets in a droplet actuator, such as droplet actuator 505, by electrical control of their surface tension (electrowetting). The droplets may be sandwiched between two substrates of droplet actuator 505, a bottom substrate and a top substrate separated by a droplet operations gap. The bottom substrate may include an arrangement of electrically addressable electrodes. The top substrate may include a reference electrode plane made, for example, from conductive ink or indium tin oxide (ITO). The bottom substrate and the top substrate may be coated with a hydrophobic material. Alternatively, by limiting the sizes of input ports for liquid loading (i.e., the loading ports) and the storage zones, liquid flow-back onto the outside surface of the top substrate is prevented and the need for a hydrophobic coating on the on the outside surface of the top substrate is eliminated. Droplet operations are conducted in the droplet operations gap. The space around the droplets (i.e., the gap between bottom and top substrates) may be filled with an immiscible inert fluid, such as silicone oil, to prevent evaporation of the droplets and to facilitate their transport within the device. Other droplet operations may be effected by varying the patterns of voltage activation; examples include merging, splitting, mixing, and dispensing of droplets.

Droplet actuator 505 may be designed to fit onto an instrument deck (not shown) of microfluidics system 530. The instrument deck may hold droplet actuator 505 and house other droplet actuator features, such as, but not limited to, one or more magnets and one or more heating devices. For example, the instrument deck may house one or more magnets 510, which may be permanent magnets. Optionally, the instrument deck may house one or more electromagnets 515. Magnets 510 and/or electromagnets 515 are positioned in relation to droplet actuator 505 for immobilization of magnetically responsive beads. Optionally, the positions of magnets 510 and/or electromagnets 515 may be controlled by a motor 520. Additionally, the instrument deck may house one or more heating devices 525 for controlling the temperature within, for example, certain reaction and/or washing zones of droplet actuator 505. In one embodiment, heating devices 525 may be heater bars that are positioned in relation to droplet actuator 505 for providing thermal control thereof.

A controller 530 of microfluidics system 530 is electrically coupled to various hardware components of the invention, such as droplet actuator 505, electromagnets 515, motor 520, and heating devices 525, as well as to a detector 535, an impedance sensing system 540, and any other input and/or output devices (not shown). Controller 530 controls the overall operation of microfluidics system 530. Controller 530 may, for example, be a general purpose computer, special purpose computer, personal computer, or other programmable data processing apparatus. Controller 530 serves to provide processing capabilities, such as storing, interpreting, and/or executing software instructions, as well as controlling the overall operation of the system. Controller 530 may be configured and programmed to control data and/or power aspects of these devices. For example, in one aspect, with respect to droplet actuator 505, controller 530 controls droplet manipulation by activating/deactivating electrodes.

Detector 535 may be an imaging system that is positioned in relation to droplet actuator 505. In one embodiment, the imaging system may include one or more light-emitting diodes (LEDs) (i.e., an illumination source) and a digital image capture device, such as a charge-coupled device (CCD) camera.

Impedance sensing system 540 may be any circuitry for detecting impedance at a specific electrode of droplet actuator 505. In one embodiment, impedance sensing system 540 may be an impedance spectrometer. Impedance sensing system 540 may be used to monitor the capacitive loading of any electrode, such as any droplet operations electrode, with or without a droplet thereon. For examples of suitable capacitance detection techniques, see Sturmer et al., U.S. Patent Application Publication No. US20100194408, entitled "Capacitance Detection in a Droplet Actuator," published on Aug. 5, 2010; and Bourn et al., U.S. Patent Publication No. US20030080143, entitled "System and Method for Dispensing Liquids," published on May 1, 2003; the entire disclosures of which are incorporated herein by reference.

Droplet actuator 505 may include disruption device 545. Disruption device 545 may include any device that promotes disruption (lysis) of materials, such as tissues, cells and spores in a droplet actuator. Disruption device 545 may, for example, be a sonication mechanism, a heating mechanism, a mechanical shearing mechanism, a bead beating mechanism, physical features incorporated into the droplet actuator 505, an electric field generating mechanism, a thermal cycling mechanism, and any combinations thereof. Disruption device 545 may be controlled by controller 530.

It will be appreciated that various aspects of the invention may be embodied as a method, system, computer readable medium, and/or computer program product. Aspects of the invention may take the form of hardware embodiments, software embodiments (including firmware, resident software, micro-code, etc.), or embodiments combining software and hardware aspects that may all generally be referred to herein as a "circuit," "module," or "system." Furthermore, the methods of the invention may take the form of a computer program product on a computer-usable storage medium having computer-usable program code embodied in the medium.

Any suitable computer useable medium may be utilized for software aspects of the invention. The computer-usable or computer-readable medium may be, for example but not limited to, an electronic, magnetic, optical, electromagnetic, infrared, or semiconductor system, apparatus, device, or propagation medium. The computer readable medium may include transitory and/or non-transitory embodiments. More specific embodiments (a non-exhaustive list) of the computer-readable medium would include some or all of the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission medium such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Program code for carrying out operations of the invention may be written in an object oriented programming language such as Java, Smalltalk, C++ or the like. However, the program code for carrying out operations of the invention may also be written in conventional procedural programming languages, such as the "C" programming language or similar programming languages. The program code may be executed by a processor, application specific integrated circuit (ASIC), or other component that executes the program code. The program code may be simply referred to as a software application that is stored in memory (such as the computer readable medium discussed above). The program code may cause the processor (or any processor-controlled device) to produce a graphical user interface ("GUI"). The graphical user interface may be visually produced on a display device, yet the graphical user interface may also have audible features. The program code, however, may operate in any processor-controlled device, such as a computer, server, personal digital assistant, phone, television, or any processor-controlled device utilizing the processor and/or a digital signal processor.

The program code may locally and/or remotely execute. The program code, for example, may be entirely or partially stored in local memory of the processor-controlled device. The program code, however, may also be at least partially remotely stored, accessed, and downloaded to the processor-controlled device. A user's computer, for example, may entirely execute the program code or only partly execute the program code. The program code may be a stand-alone software package that is at least partly on the user's computer and/or partly executed on a remote computer or entirely on a remote computer or server. In the latter scenario, the remote computer may be connected to the user's computer through a communications network.

The invention may be applied regardless of networking environment. The communications network may be a cable network operating in the radio-frequency domain and/or the Internet Protocol (IP) domain. The communications network, however, may also include a distributed computing network, such as the Internet (sometimes alternatively known as the "World Wide Web"), an intranet, a local-area network (LAN), and/or a wide-area network (WAN). The communications network may include coaxial cables, copper wires, fiber optic lines, and/or hybrid-coaxial lines. The communications network may even include wireless portions utilizing any portion of the electromagnetic spectrum and any signaling standard (such as the IEEE 802 family of standards, GSM/CDMA/TDMA or any cellular standard, and/or the ISM band). The communications network may even include powerline portions, in which signals are communicated via electrical wiring. The invention may be applied to any wireless/wireline communications network, regardless of physical componentry, physical configuration, or communications standard(s).

Certain aspects of invention are described with reference to various methods and method steps. It will be understood that each method step can be implemented by the program code and/or by machine instructions. The program code and/or the machine instructions may create means for implementing the functions/acts specified in the methods.

The program code may also be stored in a computer-readable memory that can direct the processor, computer, or other programmable data processing apparatus to function in a particular manner, such that the program code stored in the computer-readable memory produce or transform an article of manufacture including instruction means which implement various aspects of the method steps.

The program code may also be loaded onto a computer or other programmable data processing apparatus to cause a series of operational steps to be performed to produce a processor/computer implemented process such that the program code provides steps for implementing various functions/acts specified in the methods of the invention.

CONCLUDING REMARKS

The foregoing detailed description of embodiments refers to the accompanying drawings, which illustrate specific embodiments of the invention. Other embodiments having different structures and operations do not depart from the scope of the present invention. The term "the invention" or the like is used with reference to certain specific examples of the many alternative aspects or embodiments of the applicants' invention set forth in this specification, and neither its use nor its absence is intended to limit the scope of the applicants' invention or the scope of the claims. This specification is divided into sections for the convenience of the reader only. Headings should not be construed as limiting of the scope of the invention. The definitions are intended as a part of the description of the invention. It will be understood that various details of the present invention may be changed without departing from the scope of the present invention. Furthermore, the foregoing description is for the purpose of illustration only, and not for the purpose of limitation.

We claim:

1. A device, comprising:
    a top substrate and a bottom substrate separated to form a droplet operations gap therebetween;
    at least one set of reservoir electrodes disposed on the bottom substrate, wherein the bottom substrate comprises a droplet processing region having at least one arrangement of droplet operations electrodes;
    at least one on-actuator reservoir formed in the top substrate and corresponding to the at least one set of reservoir electrodes, the at least one on-actuator reservoir comprising a loading port; and
    a pressure loading source coupled to an outlet of the loading port of the at least one on-actuator reservoir.

2. The device of claim 1, wherein the outlet is an upwardly protruding outlet.

3. The device of claim 2, further comprising a cup portion fitted upon the upwardly protruding outlet of the loading port, wherein the pressure source is coupled to the cup portion.

4. The device of claim 1, wherein the at least one on-actuator reservoir further comprises a liquid storage zone, a droplet metering zone, and a droplet dispensing zone.

5. The device of claim 3, wherein the storage zone, metering zone, and dispensing zone are each characterized by different gap heights.

6. The device of claim 1, wherein the top substrate comprises a ground reference electrode.

7. The device of claim 1, wherein the at least one arrangement of droplet operations electrodes comprises at least one arrangement of electrowetting-mediated droplet operations electrodes.

8. The device of claim 1, wherein a plurality of sets of reservoir electrodes are disposed on the bottom substrate.

9. The device of claim 1, wherein the metering zone is a bulk liquid metering zone.

10. The device of claim 1, wherein the relationship of the at least one set of reservoir electrodes to the at least one on-actuator reservoir formed in the top substrate at the at least one set of reservoir electrodes is such that larger segments of the reservoir electrodes are oriented toward the storage zone of the on-actuator reservoir and smaller segments of each set of reservoir electrodes are oriented toward the dispensing zone of the on-actuator reservoir.

11. The device of claim 1, wherein a diameter of an opening leading from the loading port into the storage zone is small enough compared to the liquid storage area to prevent liquid flow-back into a space above the storage zone.

12. The device of claim 1, wherein the design of the loading port and the storage zone prevents liquid flow-back onto an outside surface of the top substrate.

13. The device of claim 1, wherein the at least one on-actuator reservoir prevents liquid from flooding into the droplet operations gap in the dispensing zone.

14. The device of claim 3, wherein the cup portion comprises an upper portion, further wherein the upper portion is enclosed but comprises an opening therein.

15. The device of claim 14, wherein the opening of the upper portion of the cup portion is substantially triangular in footprint.

16. A method, comprising:
    flowing liquid into a storage zone of a droplet actuator to fill the storage zone without (i) causing liquid to flow into a dispensing zone of the droplet actuator, (ii) creating enough pressure to permit the liquid to flow into a metering zone of the droplet actuator, the dispensing zone, or both the metering zone and dispensing zone, or (iii) creating enough pressure to cause the liquid to escape back through a loading port of the droplet actuator to an exterior of the droplet actuator;
    metering sub-droplets from the liquid in the storage zone into the metering zone using reservoir electrodes in the metering zone to yield metered droplets in the metering zone; and
    dispensing sub-droplets from the metered droplets in the metering zone, using reservoir electrodes in the dispensing zone to dispense sub-droplets onto droplet operations electrodes;
    wherein the storage zone, metering zone, and dispensing zone are each characterized by different gap heights.

17. The method of claim 16, wherein the droplet actuator comprises a top substrate and a bottom substrate separated to form a droplet operations gap therebetween.

18. The method of claim 17, wherein the bottom substrate comprises a droplet processing region having at least one arrangement of droplet operations electrodes.

* * * * *